A. SMITH.
Press Dyeing.
No. 217. Reissued May 11, 1852.
Fig. 1,
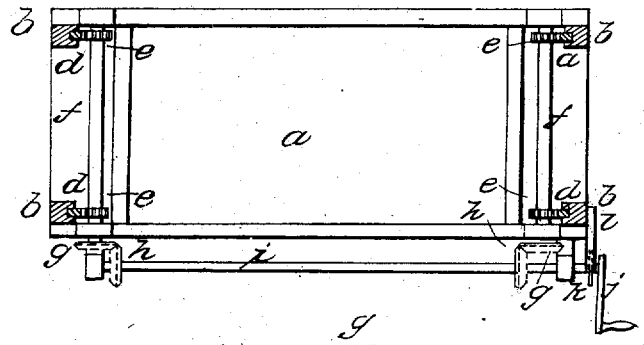
Fig. 2,
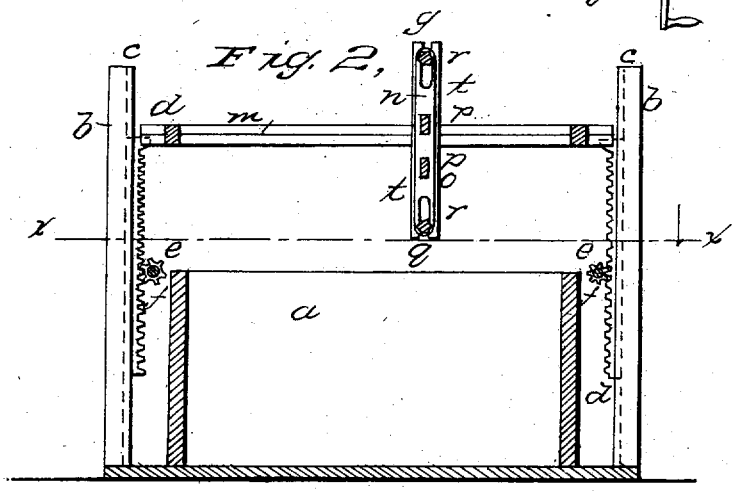
Fig. 3,
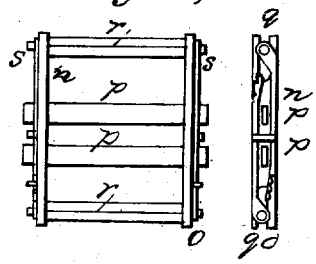
Fig. 4,
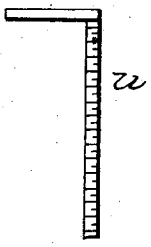
N. PETERS, Photo-Lithographer, Washington, D. C.

UNITED STATES PATENT OFFICE.

ALEXANDER SMITH, OF WEST FARMS, NEW YORK.

IMPROVEMENT IN APPARATUS FOR PARTY-COLORING YARNS.

Specification forming part of Letters Patent No. 7,446, dated June 18, 1850; Reissue No. 217, dated May 11, 1852.

*To all whom it may concern:*

Be it known that I, ALEXANDER SMITH, of West Farms, Westchester county, in the State of New York, have invented a new and useful Apparatus for Party-Coloring Yarns; and I do hereby declare that the following is a full, clear, and exact description thereof, reference being had to the accompanying drawings, making part of this specification, in which—

Figure 1 is a horizontal section at *x x* of Fig. 2, which is a longitudinal vertical section; and Fig. 3, face and side elevations of the reel-frame and reels, and Fig. 4 the scale.

The same letters in all the figures.

Yarns have heretofore been party-colored either by printing or by dipping skeins into a vat of dyeing-liquor with the parts which were not to be dyed tied or clamped up or wrapped around to prevent the access of the dyeing-liquid. But, as heretofore practiced, these methods have been attended with serious practical difficulties, the former not admitting of giving permanent colors, besides requiring complex machinery, the working of which demands much skill and attention and the latter having been unsuccessful for the reason that the means employed for preventing the access of the dyeing liquor to the parts not to be dyed would not effectually exclude the coloring-matter.

The nature of my invention consists in party-coloring yarns that have been reeled by direct immersion in the dye by means of movable frames adapted to receive and hold the skeins, and so combined with the dye-vat as to admit of letting down the yarns to the determined measured distance and then withdrawing and shifting, as may be required.

In the accompanying drawings, *a* represents a vat to contain the deying liquor, and *b b b b* four vertical posts, one at each corner, grooved out vertically, as at *c*, to receive four slides, *d d d d*, with rack-teeth in them. To these racks are fitted four pinions, *e e e e*, two on each of two horizontal shafts, *f f*, one at each end of the vat, and these two shafts are connected together to move in unison by two beveled cog-wheels, *g g*, on their ends, which engage two similar wheels, *h h*, on a horizontal shaft, *i*, which shaft is provided at one end with a crank-handle, *j*, by which the sliding racks can be elevated or depressed, and with a ratchet-wheel, *k*, and catch *l*, for holding them in any position desired.

The four sliding racks carry a horizontal frame, *m*, in which may be suspended any desired number of reel-frames similar to the one, *n*, shown in the drawings. This reel-frame is composed of two side pieces, *o o*, connected by cross-bars *p p*, which project sufficiently beyond the side pieces to rest on the frame *m*. The ends of the side pieces are slotted, as at *q*, to receive and admit of the sliding in and out of the journals of two reels, *r r*, which reels are either fluted rollers or made with wire rods attached to two heads on a shaft. The journals of these reels are fitted to turn in plates or slides *s s*, at the sides of the reel-frame, and are provided with catch-teeth, so that they can be held in any desired position by catching onto pins in the sides of the reel-frame. The yarns to be party-colored are wound by any means desired around the two reels, as represented at *t*, and then the reel-frame is suspended in the horizontal frame. As many of such reel-frames as the frame *m* will carry can be in like manner suspended. A scale, *u*, is then suspended to one of the reel-frames, and by turning the crank-handle the whole is let down into the dyeing-liquor to the depth desired, as indicated by the scale, depending on the figure to be produced in the weaving of the fabric. The lower reel is then drawn up by means of the sliding plates *s s*, so as to give the liquor free access to the whole surface of the immersed yarn.

After the proper period of immersion the whole is drawn out of the liquor, the lower reel drawn out again to tighten the yarns, and then the reel-frames removed to rinse out the surplus of coloring-matter. If the figure to be produced admits of it, as well as the distance of the two reels apart, the reel-frames may be inverted to dip the other end in like manner in the same or any other color; but otherwise the reels are to be turned to bring other parts of the yarn in a proper position to be immersed in the same or another color. In this way yarns can be party-colored in any manner desired either for the warp or weft for the weaving of figured fabrics.

It will be obvious from the foregoing that although I have described only that particular mode of construction which I have myself adopted, this may be varied greatly within the range of the principle of my invention, and therefore I do not wish to confine myself to the special mode of construction or arrangement herein specified, but to retain to myself the privilege of varying them at pleasure so long as I attain the same end by equivalent means.

What I claim as my invention, and desire to secure by Letters Patent, is—

1. The method, substantially as specified, of party-coloring yarns that have been reeled by direct and free immersion by means of frames carrying the reeled yarns, and combined with the vat containing the dyeing-liquor, by means of machinery adapted to let down and draw up the said frame and measure the extent of immersion, substantially as set forth.

2. Connecting one or both of the reels in each frame by means of slides, to admit of removing the reel from contact with the yarns while in the process of dyeing, substantially as specified.

ALEXANDER SMITH.

Witnesses:

CHS. M. KELLER,

CAUSTEN BROWNE.